June 3, 1924.
A. D. T. LIBBY
GENERATOR CONTROL SWITCH
Filed Feb. 11, 1922
1,496,582
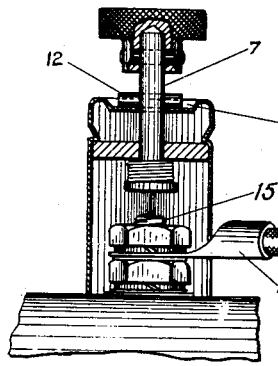
Fig. 3
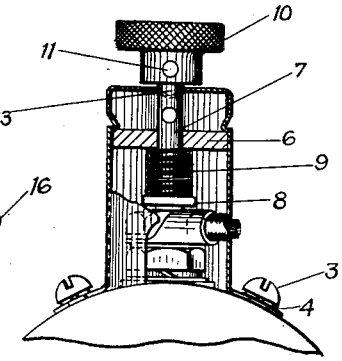
Fig. 2
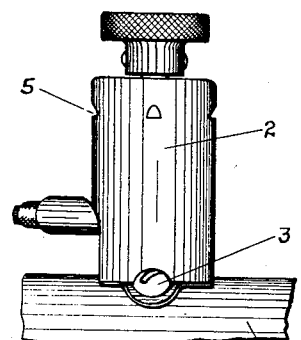
Fig. 1
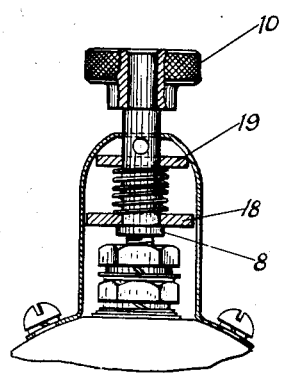
Fig. 6
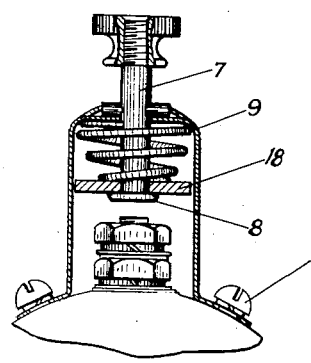
Fig. 5
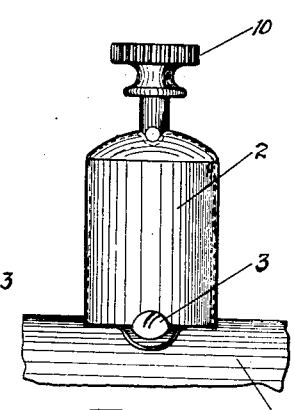
Fig. 4
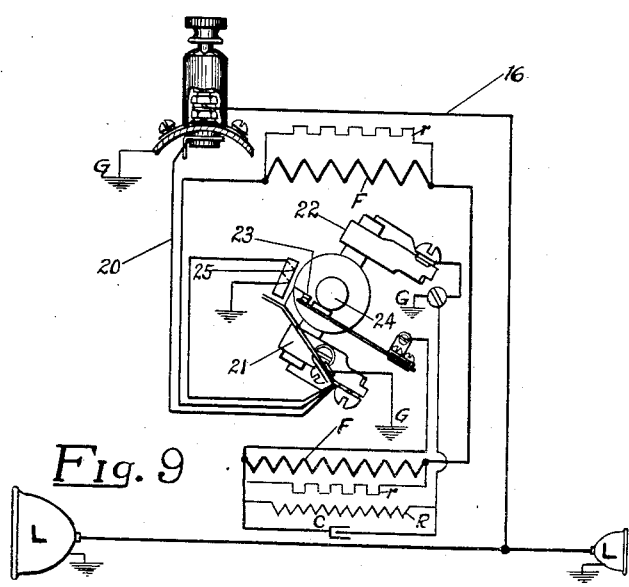
Fig. 9
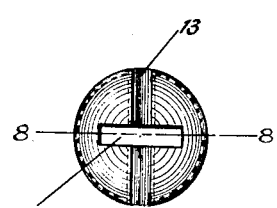
Fig. 7
Fig. 8
INVENTOR
Albion D. T. Libby Patented June 3, 1924.

1,496,582

UNITED STATES PATENT OFFICE.

ALBION D. T. LIBBY, OF EAST ORANGE, NEW JERSEY, ASSIGNOR TO SPLITDORF ELECTRICAL COMPANY, OF NEWARK, NEW JERSEY.

GENERATOR-CONTROL SWITCH.

Application filed February 11, 1922. Serial No. 535,952.

*To all whom it may concern:*

Be it known that I, ALBION D. T. LIBBY, a citizen of the United States, residing at East Orange, in the county of Essex, State of New Jersey, have invented certain new and useful Improvements in Generator-Control Switches, of which the following is a description, reference being had to the accompanying drawing and to the figures of reference marked thereon.

This invention relates to a switch used for the control of a generator which is especially adapted for use for furnishing current to an automotive vehicle where a storage battery is not utilized. Such a generator and the means of regulating the same is shown and described in Borger Patent 1,336,416 issued April 13, 1920. A generator of this type is especially suited for use on motorcycles, altho not limited to such use, and when so used, no current is required under ordinary circumstances during the day time, during which periods of time, it is desired to render the generator inert; that is to say, incapable of generating any current, although in the majority of cases the armature may be rotated at its usual speed. Whatever the load of the generator may be, when the generator is thus rendered inert as above mentioned, this load is removed from the engine. Generators of this type are usually controlled by means of a switch connected with the main lead of the generator so that this lead, and thereby the generator, may be grounded, it being assumed that the other side of the generator is normally grounded. Grounding the "live" side of the generator by such a switch, prevents the generator, which is usually of the shunt wound type, from generating voltage so that its field cannot be excited and the armature is turned in a "dead" field.

Generators of this type, when mounted on motorcycles, are considerably exposed, and the binding post to which the main feed wire to the load is attached, is apt to accidentally become grounded and when this terminal post is wired to a switch, a mounting must be provided for the switch and the same connected up in circuit as indicated.

As used on certain types of motorcycles, the generator is mounted within the frame so as to be within easy reach of the rider, and in order to eliminate the extra switch, the cost of mounting the same and wiring it up, and at the same time to protect the terminal post on the generator, I have provided a switch that is adapted to be mounted directly on the generator over the main terminal post, thereby serving a double function.

In the drawing accompanying this specification:

Figure 1 illustrates a view of the switch mounted on the body of the generator;

Figure 2 is a part sectional view through the switch, indicating the interior construction of the same, and showing the switch in closed position;

Figure 3 is a view similar to Fig. 2, but with the switch in open position;

Figure 4 is a view of a modified form of switch mounted on the generator body as in Fig. 1;

Figure 5 is a part sectional view of the switch shown in Fig. 4;

Figure 6 is a sectional view similar to Fig. 5, but with the switch in closed position, and the interior parts somewhat different from that shown in Fig. 5;

Figure 7 indicates a top plan view of the switch cover shown in Figs. 4, 5 and 6;

Figure 8 is a section on the line 8—8 of Fig. 7; while

Figure 9 is a diagrammatic view of the wiring of a generator, showing the switch mounted on a fragmentary portion of the body.

Referring now to the details wherein like numbers refer to corresponding parts in the various views, 1 is a body or frame of a generator to which is fastened a casing 2 by any suitable means such as screws 3, lockwashers 4 being preferably used to prevent the screws from loosening. As shown in Figs. 1, 2 and 3, the upper part of the casing 2, has a number of indentations 5 punched therein. Resting against these indentations is a washer 6, through which passes a plunger 7 and a collar 8 on the interior end thereof. Positioned between the collar 8 and the washer 6 is a spring 9. A button 10 is fastened to the outer end of the plunger 7 in any suitable manner, as by pin 11. The plunger 7 carries another pin 12 so disposed that when the plunger 7 is withdrawn as indicated in Fig. 3, it rests in a groove 13 which is indented in the top of the casing 2.

Extending at right angles to the groove 13 is a slot 14 punched in the top of the casing 2, whereby the pin 12 may pass through the slot 14 and by turning the button 10 a quarter turn, the pin 12 will drop into the groove 13 as described, thereby holding the plunger 7 in the position shown in Fig. 3, from which it is seen that connection between the collar 8 or the end of the plunger 7 and the terminal post 15 is broken.

It is to be understood that the body 1 of the generator is grounded, and since the casing 2 is fastened directly to the body 1, the plunger 7 and its associated parts are thereby connected to ground through the frame of the generator.

When the plunger 7, which constitutes the moving part of the switch, is in the position shown in Fig. 2, the spring 9 holds the collar in engagement with the terminal post 15, thereby grounding the main feed lead 16 which is shown connected to the terminal 15 through a connecting terminal 17.

In Fig. 5 a washer 18 rests against the collar 8 of the plunger 7 and the spring 9 engages a flattened portion of the top of the casing 2. In Fig. 6 an additional washer 19 is utilized, but the principle of operation of the switch is substantially the same in all views.

By referring to Fig. 9 it will be readily understood how the switch grounds the lead 20 coming from the armature brush holder 21 as well as the lead 16 going to the lamps L. The wiring of the generator itself and its operation will only be briefly referred to, as this constitutes no part of my invention, but in order to make the same clear, it will be stated that the armature brush 22 is grounded at G, while F represents the field windings of the generator. $r$ are non-inductive resistances around each of the field windings, while R is a regulating resistance brought into circuit by contacts 23 operated by cam 24 on the generator shaft. One of the contacts of the pair 23 is carried on a spring that is grounded, while the other spring goes to the junction of the field winding F, resistance $r$, resistance R and condenser C. The position of the contacts 23 is further controlled by the electromagnet 25 all as explained in the said Borger patent.

From the above description it will be seen that when it is desired to allow the generator to function on the load, the button 10 is pulled upward and given a quarter turn as explained, thereby removing the ground from the main terminal post of the generator. When it is desired to "kill" the generator, the button is pulled upward slightly and given a quarter turn so the pin 12 passes through the notch 14 and is then released, the spring 9 carrying the plunger 7 downward into engagement with the terminal 15, thereby grounding the generator and rendering the same inert. It is seen that the terminal post 15 is substantially covered except for the small space where the terminal 17 projects through a hole in the side of the casing and it is thus protected from mud and water and accidental grounds.

It will be apparent that numerous changes may be made in the different parts forming the switch, without departing from the spirit of my invention and the scope of the appended claims.

Having thus described my invention, what I claim is:

1. In a generator switch, a terminal thereof connected to but insulated from the body of the generator and serving as one member of the switch, a casing mounted over said terminal and serving as the other member of the switch, a plunger positioned in the top part of said casing and extending downward into engagement with said terminal, a collar carried by the plunger at its lower end, a spring positioned between said collar in the upper part of the casing for maintaining the plunger in good contact with said terminal, a button on the outer end of the plunger for raising and turning the same, a groove and slot at an angle to each other in the top of the casing, a pin carried by the plunger and adapted to pass through said slot and to rest in said groove when said plunger is raised and turned as described.

2. In a generator switch, a terminal attached to but insulated from the body of the generator and constituting a member of the switch, a casing for mounting over said terminal and constituting the other member of the switch, a plunger positioned in the top part of said casing and extending downward into engagement with said terminal, a spring associated with the plunger for maintaining it in good contact with said terminal, an operating member on the outer end of the plunger for raising the same out of engagement with said terminal and cooperating means on the plunger and casing for maintaining the plunger in withdrawn position.

3. In a generator switch, a terminal attached to but insulated from the body of the generator and constituting a member of the switch, a casing for mounting over said terminal and constituting the other member of the switch, a plunger positioned in the top part of said casing and having operating means on one end exterior to the casing and a collar on the end inside the casing, a spring around the plunger and held in position between the collar and the upper portion of the casing whereby the plunger and collar are normally forced by the spring into engagement with the said terminal, and co-operating means on the plunger and casing for holding the plunger and collar out of engagement with the terminal after the said operating means has been used to raise and turn the plunger.

4. In a generator switch, a terminal attached to but insulated from the body of the generator and constituting a member of the switch, a casing for mounting over said terminal and constituting the other member of the switch, a plunger positioned in the top part of said casing and extending downward into engagement with said terminal, a spring associated with the plunger for maintaining it in good contact with said terminal, a button on the outer end of the plunger for raising and turning the same, and co-operating means on the plunger and casing for maintaining the plunger in said raised and turned position.

5. In a generator switch, a terminal projecting from the body of the generator, which terminal and body constitute the two working terminals of the generator, a casing fastened to said body over said terminal and constituting a part of the electrical circuit of a switch, a switch member carried by the casing and having means for holding said switch member in good contact with the said terminal, means for withdrawing said switch member out of such engagement, and further means for retaining it in said withdrawn position.

6. In a combined switch and protecting cover, a generator terminal projecting through the body of the generator, a cup shaped cover fastened to the body of the generator over said terminal and constituting a part of the electrical circuit of a switch, a switch plunger carried by said cover, a button for raising and turning the plunger, a pin in the plunger, and a slot and co-operating groove in the cup for retaining the plunger after it has been withdrawn and turned, and a spring acting on the plunger to return it into engagement with the terminal after it has been turned so the pin and slot are in alignment.

In testimony whereof, I affix my signature.

ALBION D. T. LIBBY.